N. L. OLSON.
VEHICLE WHEEL.
APPLICATION FILED MAR. 26, 1917.
1,263,697.
Patented Apr. 23, 1918.
4 SHEETS—SHEET 3.
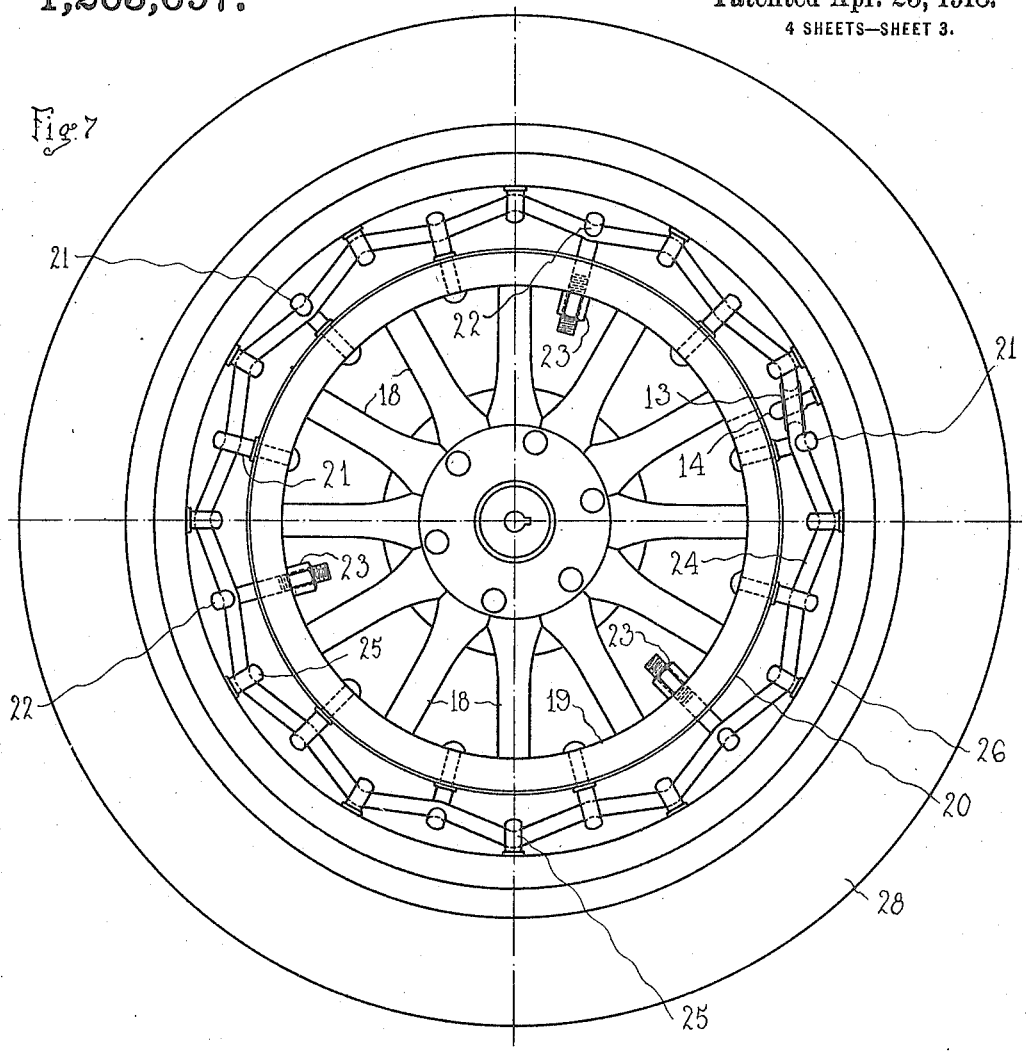
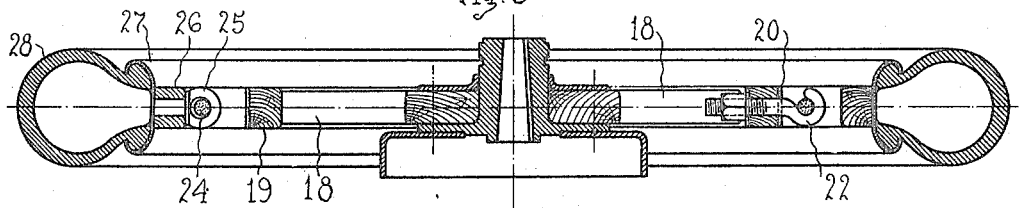
WITNESSES
Karl N. Butler
Arthur F. Draper
Nels L. Olson  INVENTOR.
BY
ATTORNEY

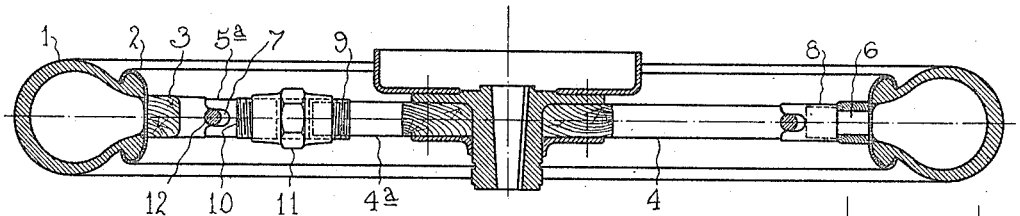
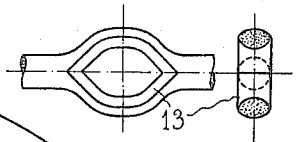
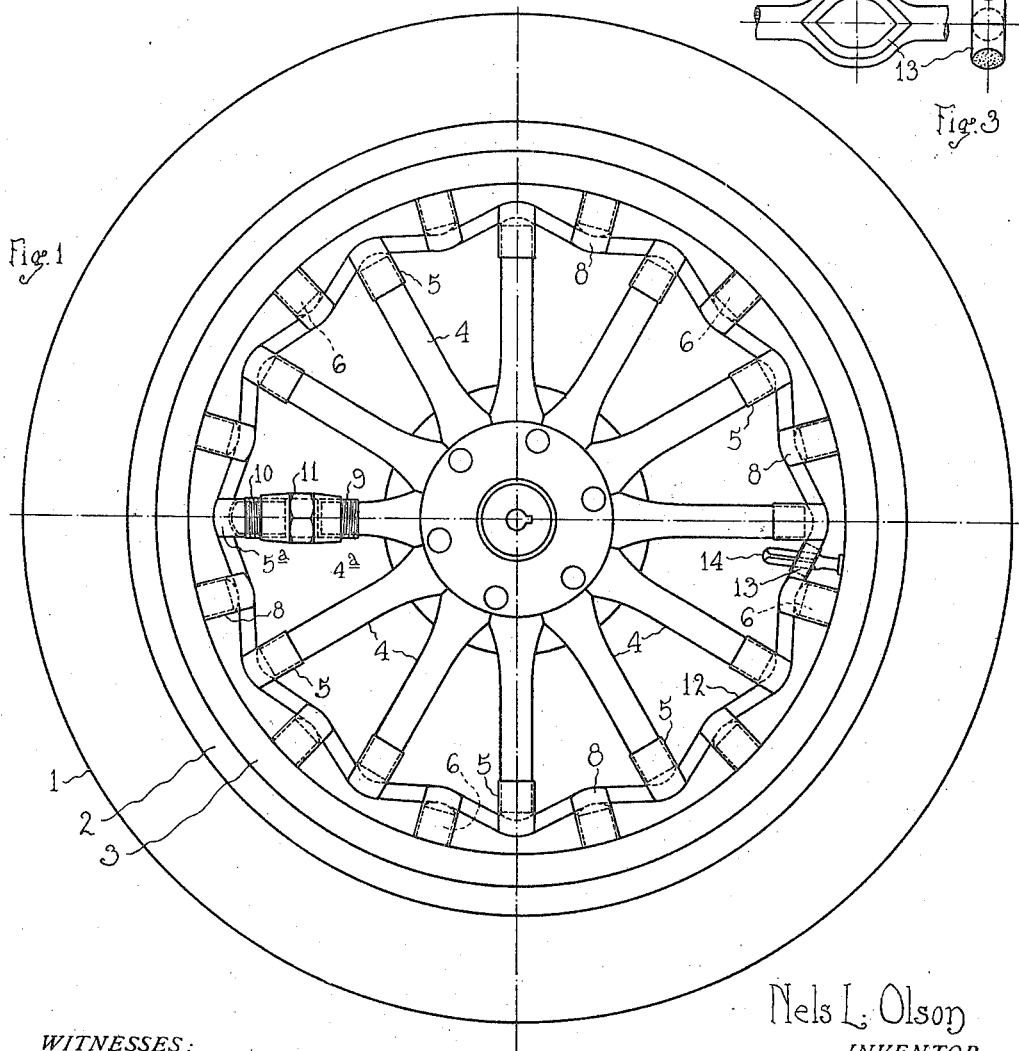

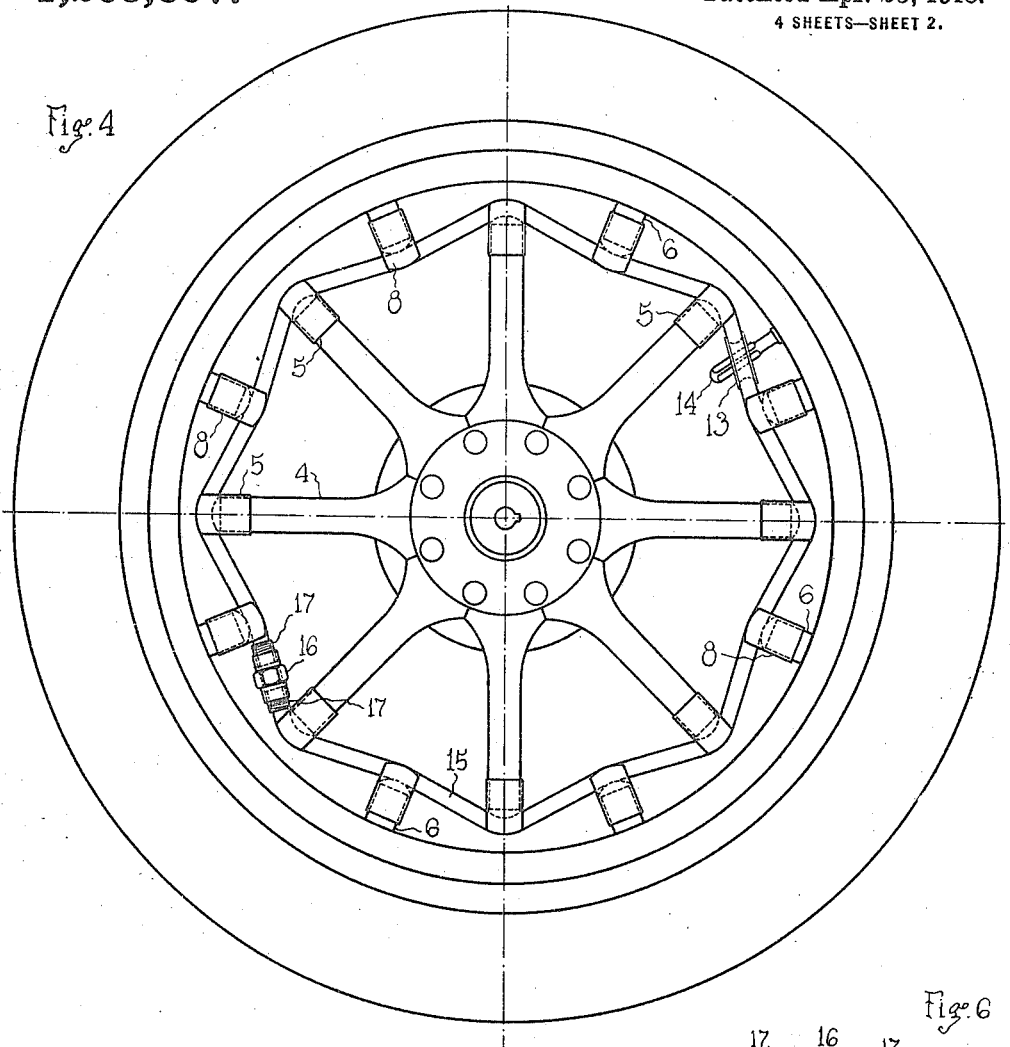
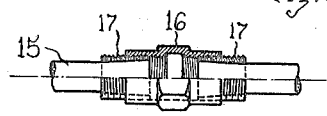
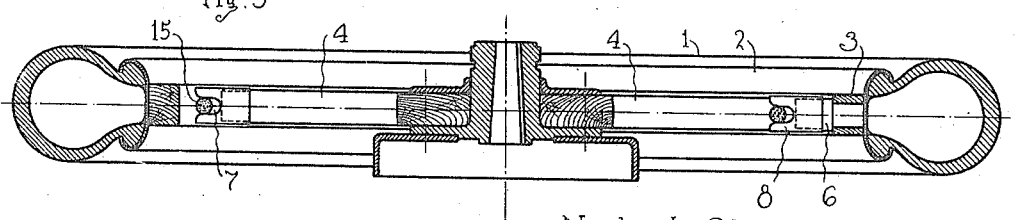

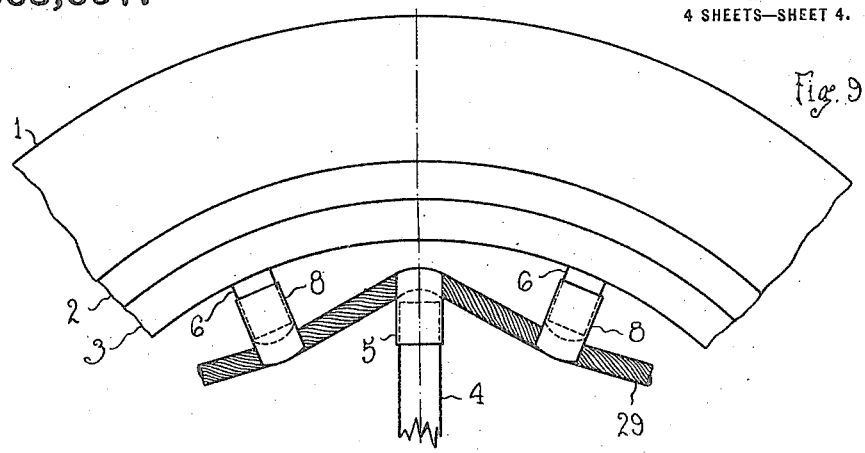
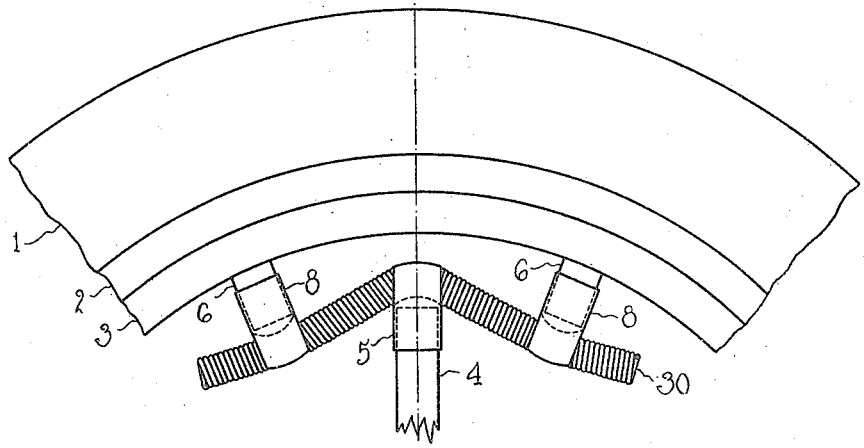
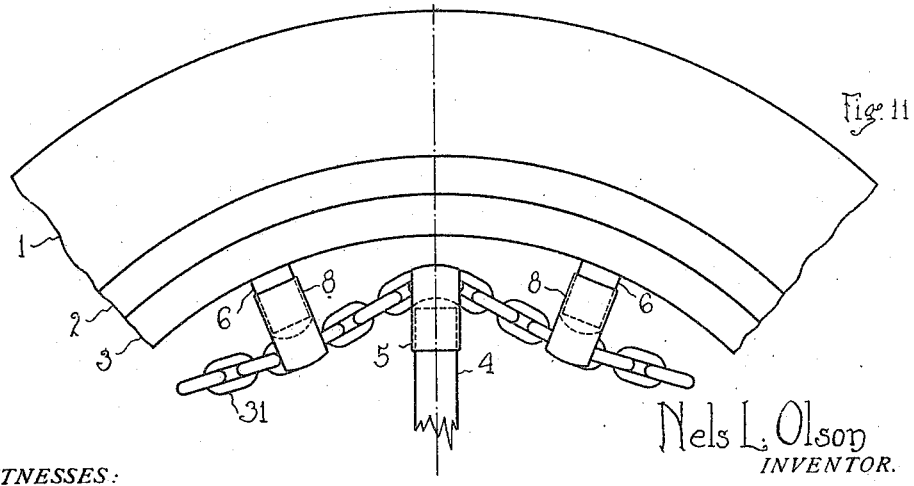

UNITED STATES PATENT OFFICE.

NELS L. OLSON, OF DETROIT, MICHIGAN.

VEHICLE-WHEEL.

1,263,697.   Specification of Letters Patent.   Patented Apr. 23, 1918.

Application filed March 26, 1917. Serial No. 157,296.

*To all whom it may concern:*

Be it known that I, NELS L. OLSON, a citizen of the United States of America, residing at Detroit, in the county of Wayne and State of Michigan, have invented certain new and useful Improvements in a Vehicle-Wheel, of which the following is a specification, reference being had therein to the accompanying drawings.

This invention relates to vehicle wheels, and has special reference to automobile wheels and means of converting an existing non-demountable wheel into a wheel having a tire that may be quickly removed and replaced by a similar spare tire.

The primary object of my invention is to interpose a flexible member between the hub and felly of a wheel which will permit of the felly being firmly held relative to the hub of the wheel and at the same time allow the felly and its appurtenant parts to be easily and quickly removed, particularly when it is desired to substitute a spare part.

Another object of my invention is to provide novel means which will permit of an existing non-demountable automobile wheel being quickly converted into a wheel having a demountable felly and tire, and this is accomplished without modification or alterations in connection with the principal parts of an automobile wheel.

Other objects and advantages of my invention will appear as the same is better understood, and reference will now be had to the drawings, wherein—

Figure 1 is a side elevation of a vehicle wheel constructed in accordance with my invention;

Fig. 2 is a cross sectional view of the same;

Fig. 3 shows detailed views of a portion of a flexible member adapted to form part of a wheel having a pneumatic tire;

Fig. 4 is a side elevation of a vehicle wheel illustrating a slight modification in connection with the flexible member thereof;

Fig. 5 is a cross sectional view of the wheel;

Fig. 6 is an enlarged elevation of a coupling member, partly in section;

Fig. 7 is a side elevation of a modified form of vehicle wheel;

Fig. 8 is a cross sectional view of the same, and

Figs. 9, 10 and 11 show portions of wheels having different kinds of flexible members.

Considering Figs. 1, 2 and 3, there is shown a conventional form of automobile wheel that has been converted into a wheel having a demountable rim portion. Ordinarily the wheel included spokes 4 that supported a felly 3 provided with a clencher rim 2 for a tire 1, but in the present instance, the spokes 4 support a flexible member 12, and this member supports the felly 3.

Mounted upon the ends of the spokes 4 are caps 5 and the outer ends of said caps have grooves 7 to receive the flexible member 12.

The felly 3 is provided with short spokes or studs 6 and mounted thereon are caps 8 similar to the caps 5 of the spokes 4 so as to receive the flexible member 12. The studs 6 are staggered or alternately arranged relative to the spokes 4 so that the caps 5 may engage the flexible member 12 between the caps 8, and this flexible member may be a wire cable, as shown in Fig. 9; a closely coiled spring, as shown in Fig. 10, or a chain, as shown in Fig. 11. The flexible member may be made endless or have its ends suitably connected together and when said member is used in connection with a wheel having a pneumatic tire, it is provided with an opening or an apertured member 13, as shown in Fig. 3, which will provide clearance for the usual air valve 14.

To draw the flexible member 12 taut so that it will be practically a rigid member between the spokes 4 and the felly 3, the spoke designated 4ª is made shorter than the other spokes, and on the end of the short spoke is placed a threaded member 9 for a nut 11.

The nut 11 receives the threaded portion 10 of a grooved cap 5ª and by adjusting the nut 11 the cap 5ª may be shifted outwardly to draw the member 12 taut and thus anchor the felly and its appurtenant parts relative to the hub portion of the wheel. The member 9 may have left hand screw threads and the threaded portion 10 of the cap 5ª right hand screw threads, so that the nuts 11 will have the action of a turn buckle for reducing or increasing the longitudinal dimension of the sectional spoke. The nut will permit of the flexible member 12 being placed under powerful tension so that it is practically a rigid member connecting the spokes 4 and the studs 6 to prevent lateral movement of the felly relative to the spokes.

Instead of placing the flexible member 12 under tension by using a short spoke and a nut, a turn buckle construction may be employed for connecting the ends of a flexible member 15, as shown in Figs. 4, 5 and 6. The turn buckle construction includes a coupling member 16 and screwed into said coupling member are socket members 17 adapted to be moved to and from each other by rotation of the coupling member 16. The socket members 17 have tapering sockets to receive the ends of the flexible member 15, and the ends of said member may be permanently held in the socket members by placing lead or Babbitt metal therein. By providing the flexible member with a take-up device all of the spokes may be the same length.

A modified form of automobile wheel is shown in Figs. 7 and 8, and in this instance the wheel spokes 18 support an inner felly or member 19 provided with a metallic band 20. Connected to the member 19 and the band 20 between the spokes 18, are radially disposed fixed hooks 21 and adjustable hooks 22, the former being greater in number. The hooks 21 and 22 have the bills thereof alternating, that is, some of the hooks are open at one side of the wheel and the remaining hooks at the other side of the wheel. The adjustable hooks may be shifted radially of the member 19 by nuts 23 and these adjustable hooks constitute take-up devices for a flexible member 24 extending through eyes 25 carried by the outer or usual felly 26 of a clencher rim 27 having a tire 28.

The caps 5 and 8 prevent the ends of the spokes or studs from splitting, and when the wire cable 29 or the chain 31 is used as a member between the spokes and the studs, there is a constant outward pressure against the studs 6 and a constant inward pressure against the spokes 4, these two pressures maintaining a rigid structure, just as though the spokes 4 were integral with the studs 6.

If a certain amount of flexibility is desired, either radially or laterally, the coiled spring 30, shown in Fig. 10, may be used as a flexible member, and in this instance the member may be made without provision for varying the tension of the same. The coiled spring will absorb road shock and materially contribute toward resiliency of a pneumatic tire or springs employed for cushioning a vehicle body.

As an instance of putting my invention into practice, I may take an ordinary "Ford" automobile wheel and cut the spokes adjacent the felly of the wheel. I may then fit the caps 5 and 8 on the spokes and the stubs thereof and use the flexible member shown in Fig. 4. A spare part will include a tire and felly having stub spokes and by loosening the flexible member, the spare part can be easily substituted for an injured part.

It is thought that the utility of my invention will be apparent without further description, and while in the drawings there are illustrated the preferred embodiments of my invention, it is to be understood that the structural elements are susceptible to such variations and modifications as fall within the scope of the appended claim.

What I claim is:—

In a vehicle wheel, a hub portion having spokes, grooved caps on the ends of the spokes of said hub portion, a felly having studs, grooved caps on the studs of said felly, said studs alternating with the spokes of said hub portion, and a flexible member disposed circumferentially of said wheel and engaging in the grooves of the caps of the studs of said felly and the grooves of the caps of the spokes of said hub portion.

In testimony whereof I affix my signature in the presence of two witnesses.

NELS L. OLSON.

Witnesses:
KARL H. BUTLER,
ANNA M. DORR.

Copies of this patent may be obtained for five cents each, by addressing the "Commissioner of Patents, Washington, D. C."